United States Patent [19]

Herring

[11] 4,348,987

[45] Sep. 14, 1982

[54] GANG SLAT ANIMAL SHELTER FLOORING WITH FORAMINOUS INSERTS, AND METHOD OF CONSTRUCTING SAME

[76] Inventor: William T. Herring, P.O. Box 181, Newton Grove, N.C. 28366

[21] Appl. No.: 243,510

[22] Filed: Mar. 13, 1981

Related U.S. Application Data

[63] Continuation-in-part of Ser. No. 79,484, Sep. 27, 1979, Pat. No. 4,256,057.

[51] Int. Cl.³ .................... A01K 1/015; A01K 1/02
[52] U.S. Cl. ................................. 119/20; 119/28
[58] Field of Search .......................... 119/28, 20, 16

[56] References Cited

U.S. PATENT DOCUMENTS

3,213,828 10/1965 Sorensen ............................. 119/20
3,905,334 9/1975 Stevenson ........................... 119/20

Primary Examiner—Hugh R. Chamblee
Attorney, Agent, or Firm—Bell, Seltzer, Park & Gibson

[57] ABSTRACT

Concrete gang slats, that underlie and support thereon farrowing crates within a farrowing house, are provided with opposing elongate side openings in which elongate foraminous inserts are positioned to accommodate newborn pigs thereon in the overlying side pens of the respective farrowing crates. The foraminous inserts are constructed to facilitate the footing of newborn pigs in suckling so as to avoid abrasion of their knees while permitting their waste to readily pass through the inserts.

22 Claims, 20 Drawing Figures

GANG SLAT ANIMAL SHELTER FLOORING WITH FORAMINOUS INSERTS, AND METHOD OF CONSTRUCTING SAME

CROSS-REFERENCE TO RELATED APPLICATION

This application is a continuation-in-part of copending application Ser. No. 079,484, filed Sept. 27, 1979, now U.S. Pat. No. 4,256,057, and entitled GANG SLAT FOR FLOORING OF AN ANIMAL SHELTER AND HAVING A WASTE-PASSAGE GRATE.

FIELD OF THE INVENTION

This invention relates to animal shelters, such as farrowing houses for swine, and more especially, to an improved flooring and method of constructing the same for such an animal shelter, in which the flooring is formed of improved concrete gang slats arranged in a row or rows in the shelter, wherein each gang slat underlies and supports thereon a farrowing crate with a sow in its central section, and wherein opposing side sections of each gang slat are provided with elongate side openings in which foraminous inserts are positioned for accommodating pigs thereon during birth and initial growth of the pigs.

BACKGROUND OF THE INVENTION

As is well known in the art of raising swine, animal shelters in the form of farrowing houses are typically used in which parallel rows of farrowing crates are supported on respective concrete floor sections known as "gang slats." Each such gang slat is of an overall width about equal to the width of a farrowing crate supported thereon, and each farrowing crate has a central pen for confining a sow therein and side pens extending along opposite sides of the central pen for accommodating a litter of pigs. The litter has access to the sow for feeding by passing under a divider extending between the central pen and each side pen.

For some time, it has been the usual practice to utilize elongate gang slats having a plurality of longitudinally extending slots therein for passage therethrough of waste from the sow and the litter of pigs in the respective farrowing crate to a pit therebelow. The slotted gang slats thus reduce cleaning and also greatly retard the spread of disease and parasites by allowing removing of animal waste from the farrowing crates. Also, the slotted floor formed of the gang slats is an essential component in controlling the atmospheric environment of the farrowing house, in that air circulates downwardly through the slots to control the temperature and the diffusion of odors.

Known gang slats, such as those discussed above, generally have included a slotted central section of reinforced concrete for supporting the sow in the central pen of a farrowing crate thereon, and they have also included slotted opposing side sections of reinforced concrete, integral with the central section, for supporting the farrowing crate side pens and the litter of pigs thereon. Most of the slots in the gang slat are relatively narrow and thus have presented only a minimal hazard to the safety of the pigs in the litter. However, in order to permit the sow's waste to more readily pass through the gang slat to the pit below, each gang slat has been provided with a group of relatively wider slots in a rear portion of the central section of the gang slat. Since such wider slots usually have been about one inch (25.4 mm) wide, it can be appreciated that the feet and legs of newborn pigs would easily be caught in such relatively wide slots and this would result in serious injury or even death to the pigs. This problem is avoided according to the invention in said copending application by providing a gang slat whose rear portion has an opening therein in which a grate means is positioned, and wherein the openings in the grate means are sufficiently small so as to permit the litter of pigs to be born thereon and walk thereon without injury as by their feet being caught in the openings of the grate means, and wherein the openings are of sufficient size for readily permitting the sow's and the newborn pigs' waste to pass therethrough.

It has now been determined that, even though the longitudinally extending slots in opposing side sections of the gang slats have been relatively narrow heretofore so that the feet and legs of newborn pigs are not likely to be caught in the slots in such side sections, the skin on the front knees of newborn pigs frequently is abraded during their feeding. The suckling of newborn pigs requires substantial pushing with their hind feet and pivoting of the front knees in attempting to maintain a nipple and at the same time to massage the udder to stimulate milk flow. Since the gang slat is made from concrete, relatively rough or abrasive surfaces are present upon which the front knees of the pigs slide while the pigs are feeding so that the skin on their front knees is abraded. In some instances, such knee abrasions are so severe that the leg bones are actually exposed and may become infected such that the infected pigs are unable to nurse and must be culled from the litter.

Attempts have been made heretofore to reduce the occurrence of such knee abrasions. One such attempt is disclosed, for example, in Arends U.S. Pat. No. 3,884,188, dated May 20, 1975, in which a knee protector pad is used on the floor of a farrowing crate. The pad is provided with spaced-apart longitudinal ridges against which the newborn pigs brace their hind feet while suckling, and during which the front knees of the pigs would be protected by smooth imperforate portions of the pad between, and adjacent opposite sides of, such ridges. While such a pad might serve to aid the newborn pigs in suckling while protecting their front knees, it can be appreciated that frequent cleaning and removal of the pigs' waste from the pad would be required to protect the health of the pigs, since otherwise, excessive waste would accumulate on the smooth imperforate portions of the pad.

OBJECTS AND SUMMARY OF THE INVENTION

With the foregoing in mind, it is a primary object of this invention to provide an improved flooring for supporting farrowing crates and a method of constructing such flooring, in which side openings in gang slat side sections have foraminous inserts therein which reduce or practically eliminate the "knee abrasions" problem discussed above by providing a multitide of surfaces against which the newborn pigs may push while feeding.

According to the invention, animal shelter flooring is constructed from a plurality of concrete gang slats arranged in side-by-side relation, and each including opposing side sections extending along opposite sides of a concrete central section and having elongate side openings therein adapted to accommodate thereover the opposing side pens of a respective farrowing crate. Foraminous inserts are positioned in the elongate side openings in the opposing side sections of each gang slat so as to provide numerous surfaces for being engaged by the hind feet of the newborn pigs and against which the newborn pigs may push while feeding and while also permitting passage of the waste from the newborn pigs therethrough.

BRIEF DESCRIPTION OF THE DRAWINGS

Some of the objects and advantages of the invention having been stated, others will appear when taken in connection with the accompanying drawings, in which.

DETAILED DESCRIPTION

The present invention will be described hereinafter with particular reference to the accompanying drawings, in which illustrative embodiments of the present invention are set forth. However, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Figure 2:
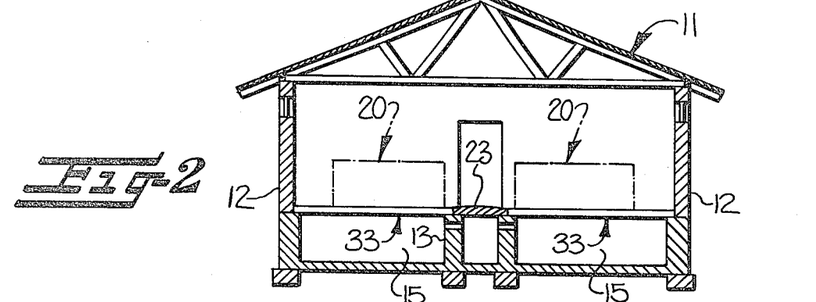
FIG. 2 is a transverse vertical sectional view through a farrowing house or facility utilizing the improved flooring and showing farrowing crates thereon in broken lines.

Referring more specifically to the drawings, as an illustrative environmental setting for the present invention, a typical farrowing house is shown in FIG. 2, broadly designated at 11, and comprising peripheral or outside walls 12 and center walls 13 that extend longitudinally along the length of the farrowing house. The gang slats forming the flooring of the present invention are formed from reinforced concrete and will be later described. Such gang slats are supported at their opposite ends on the associated peripheral walls 12 and center walls 13, and the gang slats are positioned adjacent or in abutting side-by-side relation to each other in opposing rows which extend along the length of the farrowing house 11. Thus, as further illustrated in FIG. 2, it can be seen that waste-receiving pits 15 are formed below the flooring formed of the gang slats and between the peripheral walls 12 and the adjacent center walls 13 for purposes of collection of the pigs' waste, as will be later described.

The farrowing house 11 (FIG. 2) also includes a plurality of farrowing crates 20 for confinement of the sows and litters therein. Each farrowing crate 20 includes a central pen 21 (FIG. 1) in which the sow is confined, and side pens 22 extending along opposite sides of the central pen to contain the newborn litter of pigs therein in close proximity to the sow.

The farrowing crates 20 are arranged in two spaced-apart opposing rows extending along the length of the farrowing house 11 (FIG. 2), there being one of the farrowing crates supported on each respective gang slat, with the front ends of the crates 20 in the two rows facing inwardly toward a center aisle 23 (FIG. 2) therebetween for ready access thereto. A suitable fence or barrier wall member 24 (FIG. 1), preferably of solid construction, separates adjacent farrowing crates 20 from one another and serves to limit contact between the pigs to retard the spread of contagious diseases and to promote the health and development of the litter.

Each farrowing crate 20 includes generally skeletal opposite side walls 30 and front and rear end walls 31, 32, the side walls 30 serving as dividers separating the central pen 21 and the adjacent side pens 22 so that the sow cannot enter the area in which the litter is contained. As is usual, the lower edge of each divider or side wall 30 is spaced above the lower edges of the front and rear end walls 31, 32 (see FIG. 16) so the newborn pigs can readily obtain access to the sow. Also, the raised lower edges of the dividers or side walls 30 of each crate 20 permit the pigs in the litter to move from one side pen 22 to the other side pen on the opposite side of the central pen 21 and within the same farrowing crate 20. Thus, the pigs in the litter have access to either side of the sow according to which side is exposed when the sow lies within the central pen 21.

Figure 1:
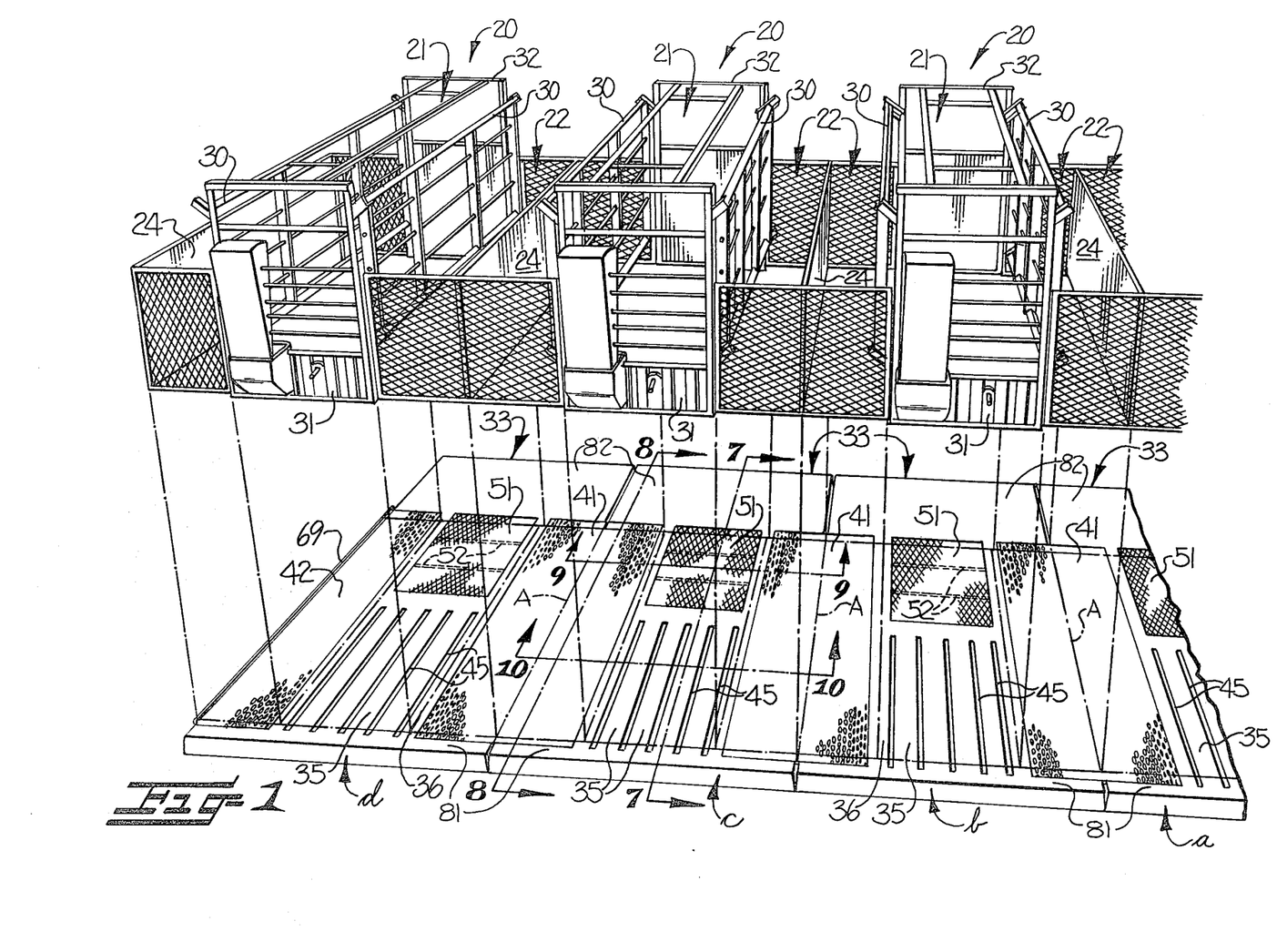
FIG. 1 is a partially exploded perspective view of a preferred embodiment of the improved flooring of the present invention, and illustrating the positional arrangement of a plurality of typical farrowing crates with respect to the gang slats there shown.
Figure 3:
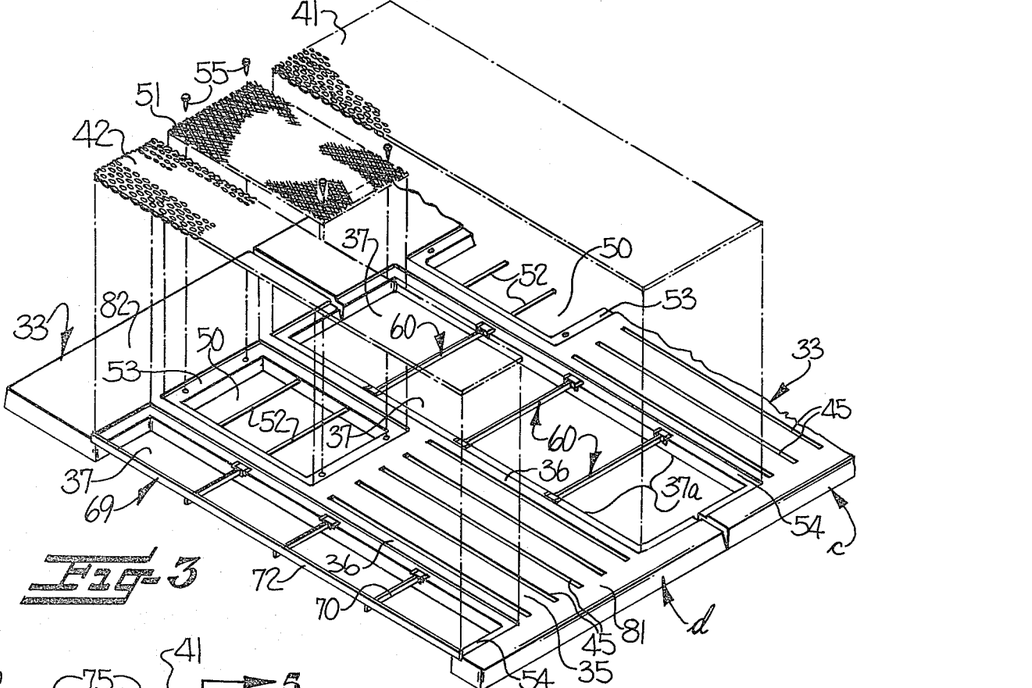
FIG. 3 is a fragmentary perspective view of the left-hand portion of the flooring illustrated in FIG. 1, particularly illustrating two of the gang slats at the end of a corresponding row and showing the corresponding foraminous inserts in spaced relation thereto for purposes of clarity.

The improved gang slats forming the animal shelter flooring of the first and preferred embodiment of the present invention are generally designated at 33 and are arranged in rows of side-by-side gang slats corresponding to the two rows of farrowing crates 20 shown in FIG. 2. FIGS. 1 and 3 illustrate portions of one row of a series of the gang slats 33, wherein the gang slats there shown are also generally designated at a, b, c, d to aid in describing the cooperative relationship between the adjacent gang slats which will be set forth later in this context.

Since all the gang slats are of essentially the same construction, only one of them will now be described in detail. At the outset, it should be noted that each gang slat 33 is formed of reinforced concrete about 3½ to 4 inches (8.89 to 10.16 cm) thick and is of an overall width about equal to the width of the farrowing crate 20. Since a single farrowing crate 20 is supported upon each gang slat 33, it will be observed, with particular reference to FIG. 1, that each gang slat 33 is of generally I-shaped configuration in plan and comprises a longitudinally extending, elongate central section 35 and opposing elongate side sections 36 formed integrally with and extending along opposite sides of the central section 35. The central section 35 is adapted to support the sow in the central pen 21 of the respective farrowing crate.

Heretofore, the opposing side sections of gang slats have been provided with elongate relatively narrow slots therein extending longitudinally of the gang slat with the litter of pigs in the side pens of an associated farrowing crate being supported upon the concrete side sections of the gang slat. Typically, such slots have been spaced apart sufficiently to ensure adequate strength of those portions of the gang slat adjacent the narrow slots for supporting the pigs thereon and maintaining the desired integrity of the gang slat during handling, installation and use of the same. However, since newborn pigs must, at times, rest on their front knees while pushing with their rear legs during suckling, owing to the relatively wide spacing between adjacent slots in the gang slat side sections, among other factors, the newborn pigs have had difficulty in properly engaging with their hind feet a wall of one of such slots to serve as an obstruction against which to push during suckling.

Consequently, during the suckling of the newborn pigs, their front knees in particular would slide on the concrete surfaces of the gang slat to such extent that, frequently, the skin on the pigs' front knees would be severely abraded, thus leading to even further injury of the newborn pigs. This knee abrasion problem is overcome or substantially eliminated, according to the present invention, by providing foraminous inserts in relatively wide elongate side openings in the opposing side sections 36 of each gang slat 33 and wherein the walls of the openings in such foraminous inserts present closely spaced surfaces which are readily engageable by the feet of newborn pigs for pushing thereagainst during suckling.

As shown in FIGS. 3, 8, 9, 10 and 13, the aforementioned elongate side openings in the opposing side sections 36 of each gang slat 33 are indicated at 37, and the corresponding foraminous inserts are indicated at 41, with the exception of that endmost insert present at either end of a row of the gang slats 33, such endmost inserts being indicated at 42 in the left-hand portions of FIGS. 1 and 3. It is apparent that the elongate side openings 37 in the opposing side sections 36 of each gang slat 33, within which foraminous inserts are positioned, are adapted to accommodate thereover the opposing side pens of a respective farrowing crate 20.

As is preferred, the elongate side openings 37 in the opposing side sections 36 of the gang slats 33 of the first embodiment of the invention are open to the respective sides of the gang slat 33, and the elongate foraminous inserts 41, 42 positioned in the openings 37 form a foraminous flooring adapted to support the litter of pigs in the side pens of the respective farrowing crate 20. The foraminous inserts will be later described in more detail.

From the foregoing description, it can be appreciated that the central pen 21 of each farrowing crate 20 overlies the central section 35 of the respective gang slat 33 and that the side pens 22 of each farrowing crate 20 overlie the side sections and the foraminous inserts in the side openings in the opposing side sections of the respective gang slat 33. Thus, as represented by the broken lines A in FIG. 1, which is a projection of the dividers or side walls 30 and the barrier walls 24 of the farrowing crates 20 on the respective gang slats 33, it is apparent that the dividers 30 not only separate the central and side pens 21, 22 but also serve to define the junctures of the central section 35 and the side sections 36 of each respective gang slat 33.

Since the newborn pigs may walk across the central section 35 in front of the sow in the central pen 21, the forward or front portion of the central section 35 of the gang slat 33 is provided with a plurality or group of longitudinally extending slots 45 therein which are provided for the passage of waste from the litter of pigs through the gang slat to the pit 15 therebelow. The slots 45 formed in the front portion of the central section 35 of the gang slat 33 define a transverse row of spaced-apart, elongate, relatively narrow slots over which the pigs may walk without their legs and feet being caught therein, and through which waste from the litter of pigs will readily pass to the pit 15. Typically, the slots 45 are about three-eighths inch (9.53 mm) wide.

Prior to the invention disclosed and claimed in said copending application, it had been conventional practice to provide a plurality or group of longitudinally extending relatively wide slots in the rear portion of the central section of a gang slat, and the sow would be positioned within the central pen so that the wider slots last mentioned were positioned underneath rear portions of her body for readily receiving the deposited waste therethrough for passage into the pit therebelow.

As disclosed in said copending application, in order to avoid the need for the prior practice of temporarily placing a mesh grate over such slotted rear portions of the gang slat for protecting the feet and legs of the pigs during birth and initial growth of the pigs, it will be observed in FIGS. 1, 3, 7 and 13 that the rear portion of the central section 35 of the gang slat 33 has been provided with a built-in foraminous insert or grate means as illustrated. A relatively large opening 50 is provided in the gang slat which is preferably substantially rectangularly shaped and is of about the width of the central pen 21 of the respective farrowing crate 20. As shown, the length of the opening 50 is about equal to one third of the length of the central section 35 of the gang slat 33 over which the central pen 21 of the respective farrowing crate 20 extends. Of course, the width of the central section 35 of the gang slat 33 is preferably approximately the same as the width of the central pen 21 of the respective farrowing crate 20. Typically, the size of the opening 50 provided in a typical gang slat 33 was approximately eighteen inches (45.72 cm) wide and approximately thirty inches (76.2 cm) long.

Figure 11:
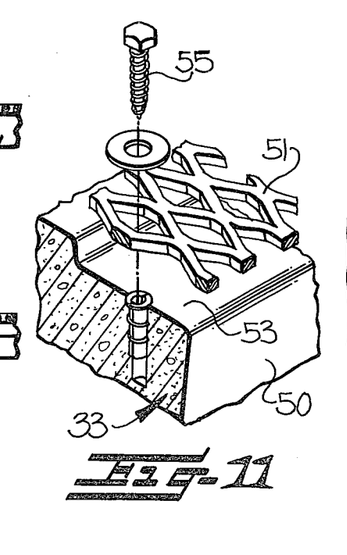
FIGS. 11 and 12 are enlarged fragmentary perspective views taken looking generally in the direction of the respective arrows 11 and 12 in FIG. 9.

A foraminous insert or grate means is carried by the rear portion of each gang slat central section 35 and is positioned in the respective opening 50, with openings being provided in the grate means which are sufficiently small so as to permit the litter of pigs to be born thereon and walk thereon without injury, as by their feet being caught in the openings, but wherein the openings are of sufficient size for readily permitting the sow's and the newborn pigs' waste to pass therethrough. Accordingly, the grate means, hereinafter referred to as a grate, is best shown in FIGS. 1, 7, 9 and 11 in the form of a substantially rectangular grate 51 which may be formed of sheet metal at least about one-eighth inch (3.18 mm) thick for providing adequate support for the sow in the central pen 21 of the respective farrowing crate. As shown in FIG. 11, the grate 51 may be made from expanded metal and is provided with openings which may be of any desired shape and size provided that they are sufficiently small to permit the litter of pigs to be born thereon and walk thereon without injury, as by their feet being caught in the grate openings, and are of sufficient size and number to assure passage of the sow's and the newborn pigs' waste therethrough.

Figures 7, 8:
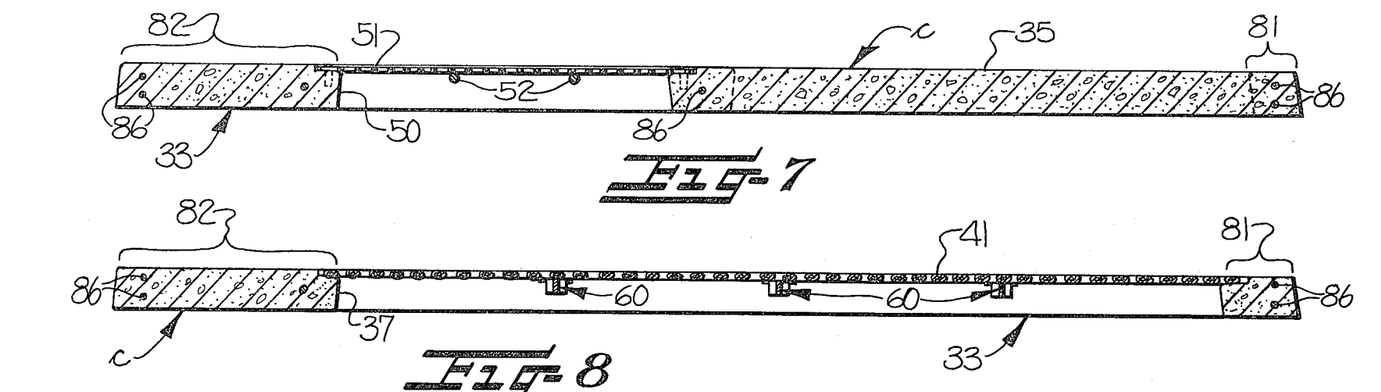
FIGS. 7 and 8 are longitudinal vertical sectional views through one of the gang slats taken substantially along the respective lines 7—7 and 8—8 in FIG. 1.
Figure 9:
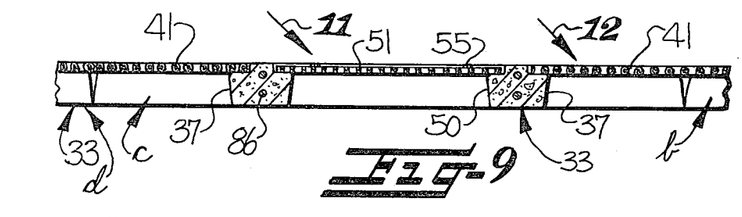
FIGS. 9 and 10 are transverse vertical sectional views through one of the gang slats and portions of immediately adjacent gang slats on either side thereof, and being taken substantially along the respective lines 9—9 and 10—10 in FIG. 1.

For supporting the grate 51, each gang slat 33 is provided with shoulder means or shoulders 53 defining marginal edge portions of the large opening 50, the shoulder means 53 being recessed relative to the upper surface of the gang slat 33. As best shown in FIGS. 7 and 9, the grate 51 is carried by the rear portion of the central section 35 of the gang slat 33, overlies the large opening 50 and is engagingly supported upon the respective shoulder means 53, with the depth of the shoulder means being such that the upper surface of the grate 51 is positioned no higher than the upper surface of the respective gang slat. Spaced support members or rods 52 (FIGS. 3, 7 and 13) also may be provided across the large opening 50 to aid in supporting the grate 51. As shown, the support members 52 may be embedded in the concrete substantially flush with the shoulder means 53 at opposite sides of the respective large opening 50.

Figure 12:
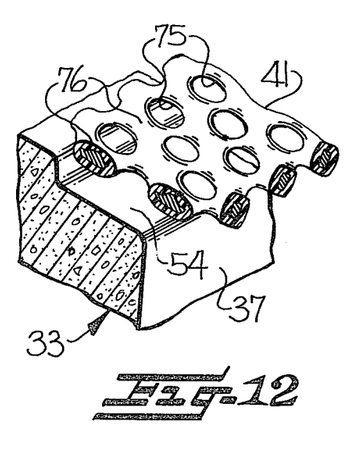

It will also be observed in FIGS. 3, 8, 9, 10 and 12 that the foraminous insert means or foraminous inserts 41, 42 are carried by the gang slats 33 in overlying relation to the side openings 37 thereof and are engagingly supported upon respective shoulder means 54 defining marginal edge portions of the side openings 37. The shoulder means 54 extends along the three sides of each opening defined by the concrete of each gang slat 33 and is preferably of about the same or somewhat greater depth than the thickness of the foraminous inserts 41 or 42, as the case may be. As shown in FIGS. 11 and 12, the shoulder means 53, 54 are each in the form of a shallow groove extending along upper surface portions of the gang slat 33 defining solid edges of the respective openings 50, 37. It is preferred that the foraminous inserts 41, 42 are each of a length substantially equal to the length of each respective overlying side pen 22 of each farrowing crate 20. In this regard, as shown in FIGS. 1, 3 and 8, each foraminous insert 41, 42 is of a length extending along the major portion of the length of the respective gang slat 33. It is preferred that each foraminous insert 41, 42 is of about the same or somewhat lesser width than the respective side pen 22 of a respective farrowing crate 20.

As indicated by the broken, dash-dot lines in FIG. 1, the front and rear end walls 31, 32 of the farrowing crates 20 extend over and across opposite end portions of the foraminous inserts 41, 42 to aid in holding the inserts in the corresponding side openings 37 (FIG. 3) in the gang slats 33. The rear end wall 32 of each farrowing crate 20 also extends over and across the rear end portion of each respective grate 51. To aid in securing such grate 51 in the respective opening 50 in each gang slat 33, supplemental fastening means, such as screws 55, may be used (FIG. 11) to prevent the sow from dislodging the grate 51 from its respective opening 50.

As heretofore described, in the preferred embodiment of the invention, the elongate side openings 37 in the opposing side sections 36 of the gang slat 33 are open to the respective sides of the gang slats. Thus, by referring especially to the central portions of FIGS. 3 and 13, with the gang slats 33 arranged in a corresponding row in side-by-side relation to each other, the side openings in adjacent sides of the gang slats cooperate and combine with each other to form larger openings indicated at 37a in FIG. 3. Each of the foraminous inserts 41 is preferably a unitary integrally formed insert of such size as to extend over the entire length and width of such a larger opening 37a, with one longitudinal side edge of the foraminous insert 41 resting upon the shoulder means 54 and extending over the side opening 37 of one of the gang slats, such as the gang slat c in FIGS. 1 and 3, and with the opposite longitudinal side edge portion of the same foraminous insert 41 overlying that elongate side opening 37 and corresponding shoulder means 54 of the next adjacent gang slat, such as that indicated at d in FIGS. 1 and 3.

Since the foraminous inserts 41 are of substantial length and width, and thus relatively heavy, it will be observed in FIG. 3 that each of the relatively larger openings 37a is preferably spanned by a plurality of supporting members or brackets 60 which are inserted within and extend across the larger openings 37a, prior to positioning the inserts 41 in the respective larger openings, to aid in supporting the inserts. While it is possible to utilize foraminous inserts 41, 42 which are sufficiently strong and rigid to avoid the need for any intermediate support therefor, this might be unduly expensive, and it is preferred that intermediate supports are used. One of the elongate supporting brackets 60 is shown in more detail in FIG. 14 wherein it will be observed that it comprises an elongate bar 61 having a pair of flanges or angle clips 62 on opposite ends thereof which are adapted to rest upon the seats of relatively small, shallow cavities or recesses 63 formed in the shoulder means 54 defining the sides and opposite ends of the adjacent elongate side openings 37 of the adjacent gang slats 33. It should be noted that the overall length of each support bracket 60 is such that the horizontal flanges thereof will readily fit in the recesses 63 as the vertical flanges at opposite ends of the bar 61 may be dropped into place loosely between the proximal edges of the openings 37 in the adjacent gang slats 33.

It will be noted that the foraminous insert 42 may be only about one half the width of each of the foraminous inserts 41, since it is used for the endmost gang slat d (FIGS. 1, 3 and 13) in the corresponding row and thus need only cover one of the side openings 37 of the corresponding gang slat. To further aid in supporting the endmost foraminous insert 42 at the corresponding end of the row of gang slats 33, it will observed in FIGS. 13 and 15 that bracket means 69, in the form of relatively short support members or brackets 70, somewhat similar to the aforementioned support brackets 60, but which may be the equivalent of only one half of one of the brackets 60, are welded or otherwise suitably secured to an elongate frame member 72 common to all of the brackets 70. The frame member 72 is preferably of such length that opposite end portions thereof may rest upon the shoulder means 54 of the corresponding endmost gang slat d with the frame member 72 extending substantially in alignment with the extreme outermost side edges of the opposite end portions of the gang slat d.

Figures 14, 15:
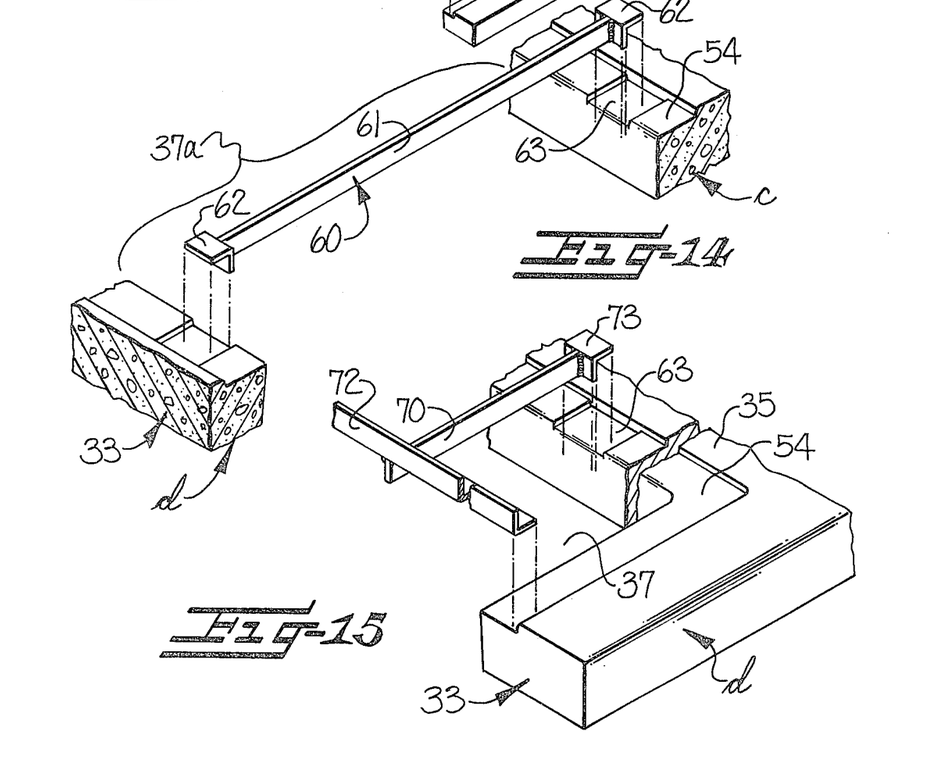
FIG. 14 is an enlarged fragmentary view of one of the brackets shown in the right-hand upper portion of FIG. 13 and showing portions of the adjacent gang slats in exploded relation thereto.
FIG. 15 is a view somewhat similar to FIG. 14, but illustrating portions of the bracket means in the left-hand portion of FIG. 13 on an enlarged scale.

The inner ends of the brackets 70 also have angle clips 73 thereon adapted to be seated in the recesses 63 in that portion of the shoulder means 54 of the outermost side opening 37 which is most closely positioned adjacent the central section 35 of the respective gang slat d. As preferred, the frame member 72 is in the form of an angle bar and cooperates with the brackets 70 to form a composite support bracket for the corresponding endmost foraminous insert 42. The upwardly facing vertical flange of the substantially horizontally disposed frame member or angle bar 72 thus may serve as a guide or screed against which an additional concrete flooring, not shown, may be formed after the flooring formed of the gang slats 33 has been installed.

Figure 4:
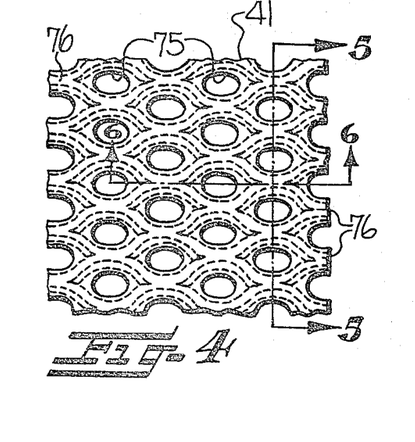
FIG. 4 is a fragmentary plan view of a portion of one of the foraminous inserts.
Figure 5:
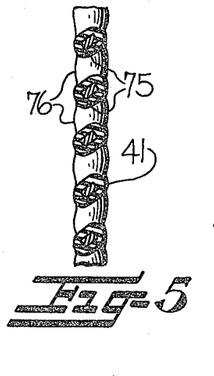
FIGS. 5 and 6 are fragmentary sectional views taken substantially along the respective lines 5—5 and 6—6 in FIG. 4.
Figure 6:
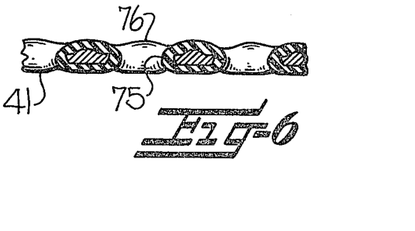

Each foraminous side insert 41, 42 is preferably formed of expanded metal in which the strand-like components of the metal extend in a sinuous manner in the longitudinal direction of each foraminous insert, i.e., from left to right, as viewed in FIG. 4, and the entire surfaces of each foraminuous insert 41, 42, with the exception of its cut peripheral edges, are coated with a relatively thick, smooth layer of plastic material substantially as shown in FIGS. 5 and 6. A product of this type, marketed under the name SANI-DECK, has proven to be very satisfactory and will hereinafter be described in greater detail.

The particular chemical properties of the plastic coating on the foraminous inserts need not be given here, but it is desirable that the plastic coating be of such hardness that a workman can make a visible indentation in the surface of the coating with his thumbnail, but would require a cutting tool or other implement in order to cut or mutilate the surface of the plastic coating. The plastic coating may be at least about one-eighth inch (3.18 mm) thick, and the holes or openings 75 defined by the plastic coating on each foraminous insert 41, 42 preferably are elliptical or oval shaped with each hole or opening 75 preferably having a width of no more than about one-half to nine-sixteenths inch (12.7 to 14.29 mm) and a length of about three-fourths to one and one-eighth inch (19.05 to 28.58 mm). By way of example, the metal base or body of which each foraminous insert 41, 42 is formed may have a nominal thickness of about one-eighth inch (3.18 mm) and each plastic-coated insert 41, 42 may have an overall thickness of about nine-sixteenths to five-eighths inch (14.29 to 15.88 mm). For providing surfaces against which the newborn pigs may push with their feet, and which "pushing" surfaces are readily found and engaged by the newborn pigs during feeding, the holes 75 in each foraminous insert 41, 42 preferably are arranged in longitudinal and transverse rows with the holes in adjacent rows being staggered, substantially as shown in FIG. 4, and with the faces of each insert being of undulating configuration along each such row of holes or openings 75. Such undulating configuration presents outwardly or upwardly projecting ridges 76 extending longitudinally of and along opposite sides of each hole or opening 75.

The ridges 76 merge with the walls of the holes 75 and are thus readily found and engaged by the feet of the newborn pigs. The size of the holes 75 is such that the pig's feet may slide down the ridges 76 and partially into the holes 75. It should be noted that the holes 75 are oriented in the foraminous inserts 41, 42 so that the lengthwise dimensions of the holes 75 extend lengthwise of the respective inserts and so that lengthwise extending ridges or shoulders 76 alongside the respective holes are oriented so as to be readily engaged by the feet of the newborn pigs to enhance their footing during suckling. However, it also should be noted that the holes or openings 75 in each foraminous insert 41, 42, as well as those holes in each grate 51, are sufficiently small and are so shaped as to permit a litter of newborn pigs to walk thereon without injury, as by their feet being caught in the openings. Further, it is to be noted that the holes or openings 75 in each plastic-coated insert 41, 42, and the holes in each grate 51, are of sufficient size and number for readily permitting the sow's and newborn pigs' waste to pass therethrough.

As indicated earlier, the sheet material of which each foraminous insert 41, 42 is formed may be of a type known as SANI-DECK distributed by Metalex Corporation, Post Office Box 399, Libertyville, Ill. 60048. The metal base or body of such foraminous sheet material is a rigid, non-raveling piece of metal that has been slit and expanded or stretched.

Although it is preferred that a one-piece, common, foraminous insert 41 is positioned in and covers each larger opening 37a (FIGS. 3 and 13) formed by combining the elongate side openings 37 in adjacent gang slats 33, it is to be understood that two or more relatively narrow elongate foraminous inserts may be used for covering each such larger opening 37a without departing from the invention.

Referring again to the construction of the gang slats 33, each gang slat 33 includes reinforced concrete opposite end sections 81, 82 which extend transversely of and are integrally formed with opposite ends of the central section 35 and the opposing side sections 36. As best shown in FIG. 3, it will be observed that the transverse opposite or front and rear end sections 81, 82 of each gang slat 33 extend outwardly beyond opposite longitudinal side edges of the central body formed of the central section 35 and the opposing side sections 36 of the gang slat 33 so that the opposite end portions of the opposing transverse end sections 81, 82 define opposite ends of the opposing relatively wide elongate side openings 37. By referring to FIG. 1, it can be seen that the rear end section 82 of each gang slat is adapted to be positioned entirely exterior to the respective farrowing crate 20. Thus, the rear end sections 82 of the gang slats 33 serve for defining a rear side aisle floor in the farrowing house for passage to and from the associated farrowing crate.

Figure 10:
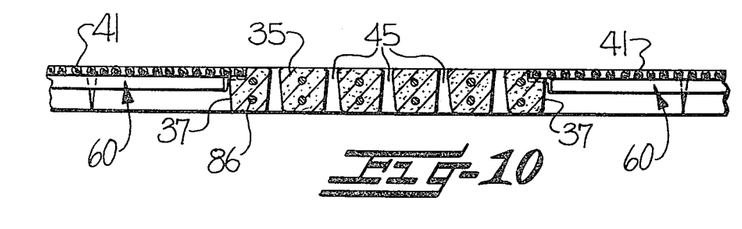

To provide the desired structural strength to each gang slat 33, reinforcing rods 86 are arranged in upper and lower networks and embedded within each respective gang slat 33, as best shown in FIGS. 7-10. The reinforcing rods 86 extend longitudinally of each gang slat and within the slat portions thereof between the slots 45 (FIG. 10). Reinforcing rods 86 also extend transversely within the end sections 81, 82 of each respective gang slat 33 (FIGS. 7 and 8). The rear ends of the longitudinally extending relatively narrow slots or openings 45 in each gang slat 33 are spaced forwardly from the respective relatively large opening 50 in the central section 35 of the respective gang slat so as to provide an uninterrupted intermediate transverse bridging portion of the concrete thereat, through which at least one of the reinforcing rods 86 preferably extends (FIG. 7).

Figure 13:
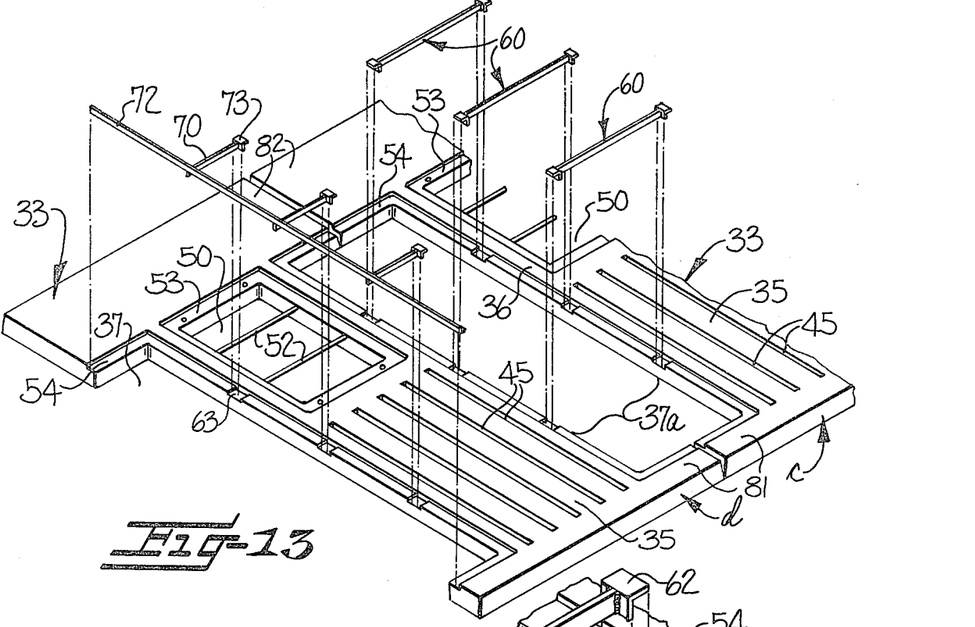
FIG. 13 is a fragmentary perspective view somewhat similar to FIG. 3, but omitting the foraminous inserts and showing corresponding support bracket means in exploded relation to the gang slats.

The method of constructing animal shelter flooring in accordance with the present invention comprises the steps of providing a plurality of concrete gang slats 33 as heretofore described, and arranging them in side-by-side relation substantially as shown in FIGS. 1, 3 and 13, but prior to installing the bracket means or foraminous inserts 41 heretofore described. When the gang slats 33 are arranged in such side-by-side relation, the side openings 37 in adjacent sides of the gang slats 33 are substantially aligned with one another and thus cooperate and combine with each other to form the larger openings 37a thereof. Thereafter, foraminous inserts 41 are positioned in the larger openings to form a foraminous flooring adapted to support the litters in the side pens 22 of immediately adjacent farrowing crates 20. As heretofore indicated, it is desirable that the foraminous inserts in the larger openings 37a are each in the form of a unitary integrally formed foraminous insert positioned in each of such larger openings 37a. Further, in accordance with the present method, since the foraminous inserts 41 are of substantial length, it can be seen that a plurality of insert supporting brackets 60 are positioned transversely across each of the larger openings 37a prior to positioning the inserts 41 in the openings to thereby aid in supporting the respective inserts. Either before or after the foraminous inserts 41 have been installed, a grate 51 is positioned in each of the relatively large openings 50 in the central sections 35 of the gang slats 33.

It is apparent that, after the endmost gang slat, such as the gang slat d in FIGS. 1, 3 and 13, is arranged to define the end of a row of gang slats 33, the composite bracket means 69 is positioned in the corresponding outer side opening 37 of the gang slat d in the manner described with respect to FIGS. 3, 13 and 15, whereupon the foraminous insert 42 is positioned in the latter side opening 37 with edge portions of the foraminous insert 42 engagingly supported upon the corresponding shoulder means 54.

SECOND OR MODIFIED EMBODIMENT OF THE INVENTION

Referring to FIGS. 17-20, the second embodiment of the invention there shown differs largely from the first embodiment in that the outer sides of the elongate relatively wide side openings in each gang slat are closed by respective relatively narrow, elongate concrete slat portions 90. In other respects, the second embodiment of the invention is substantially the same as the first embodiment and will, therefore, bear the same reference characters with the prime notation added, where applicable, to avoid repetitive description.

Accordingly, it can be seen that elongate slat portions 90 on opposite sides of each gang slat 33' are parts of the opposing side sections 36' and are formed of reinforced concrete integrally with the opposite end sections 81', 82'. Assuming that the farrowing crates 20' and the gang slats 33' of FIGS. 17-20 are of substantially the same shape and size as the respective farrowing crates 20 and gang slats 33 of the first embodiment of the invention shown in FIGS. 1-16, it can be appreciated that the elongate foraminous side inserts 41' of FIGS. 17-20, and the respective elongate side openings 37' would be somewhat narrower than the foraminous insert 42 and the respective side opening 37 in the left-hand portion of FIG. 3, for example.

The side opening 37' in each of the opposing side sections 36' may extend along the full length of the respective side section 36'. As shown, however, each side section 36' is provided with a medial concrete bridging portion 91 which, in effect, defines the juncture of two longitudinally aligned and longitudinally extending side openings 37' in each of the opposing side sections 36' of the gang slat 33' shown in FIG. 17. Thus, a reinforcing rod 92 is accommodated by the medial concrete bridging portions 91 in opposite side sections 36' and may extend substantially all the way across the corresponding concrete gang slat 33' without being exposed to the waste from the sow and/or the litter of pigs in the respective farrowing crate 20'.

Figures 16, 17:
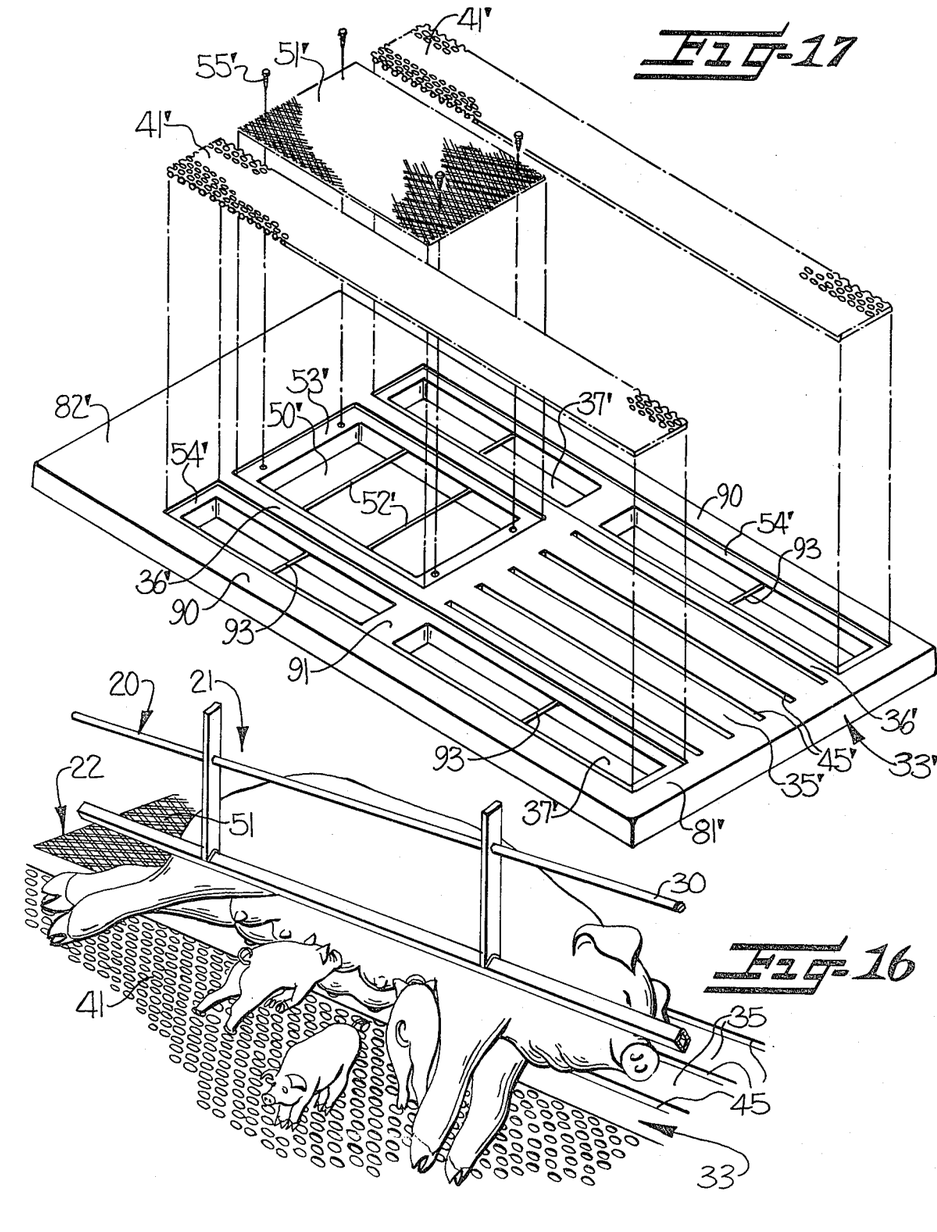
FIG. 16 is an enlarged fragmentary perspective view of portions of foraminous inserts and a gang slat showing how a foraminous insert adjacent one side of the central section of the gang slat may support suckling pigs and also showing how surfaces which define the openings in the latter foraminous insert are readily contacted by the hind feet of a pig pushing thereagainst during feeding.
FIG. 17 is an enlarged, partially exploded perspective view similar to FIG. 3, but showing a second embodiment of one of the improved gang slats of the present invention.
Figure 19:
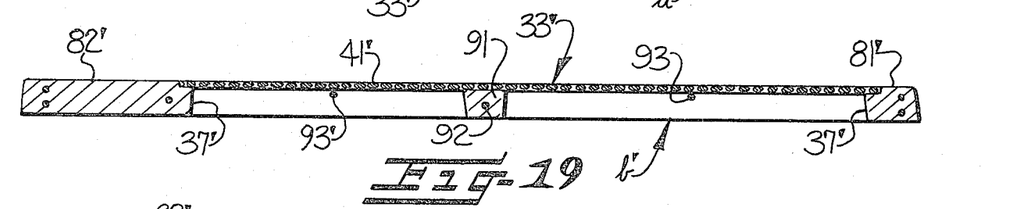
FIGS. 19 and 20 are respective longitudinal and transverse sectional views through the second form of gang slat and being taken substantially along the respective lines 19—19 and 20—20 in FIG. 18.
Figure 20:
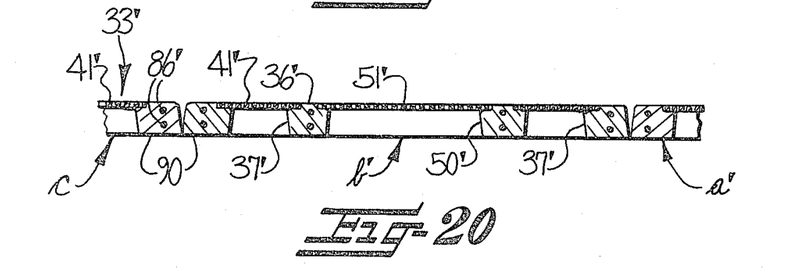

It will be observed in FIGS. 17 and 19 that the upper surface of each of the medial concrete bridging portions 91 in the opposing side sections 36' of the gang slat 33' is recessed with respect to the upper surface of the gang slat 33' so that they are substantially flush with the shoulder means 54'. Thus, the respective foraminous insert 41' may be inserted in the corresponding opening or openings 37' and will be positioned in a substantially flat condition therein. Further support means is provided for medial portions of the foraminous inserts 41' and may take the form of support brackets, rods or members 93 extending transversely across the medial areas of the openings 37' with opposite end portions thereof being embedded in the concrete defining opposite sides of the respective openings 37'. The upper surfaces of the support rods 93 may be substantially flush with the upper surfaces of the shoulder means 54'.

Figure 18:
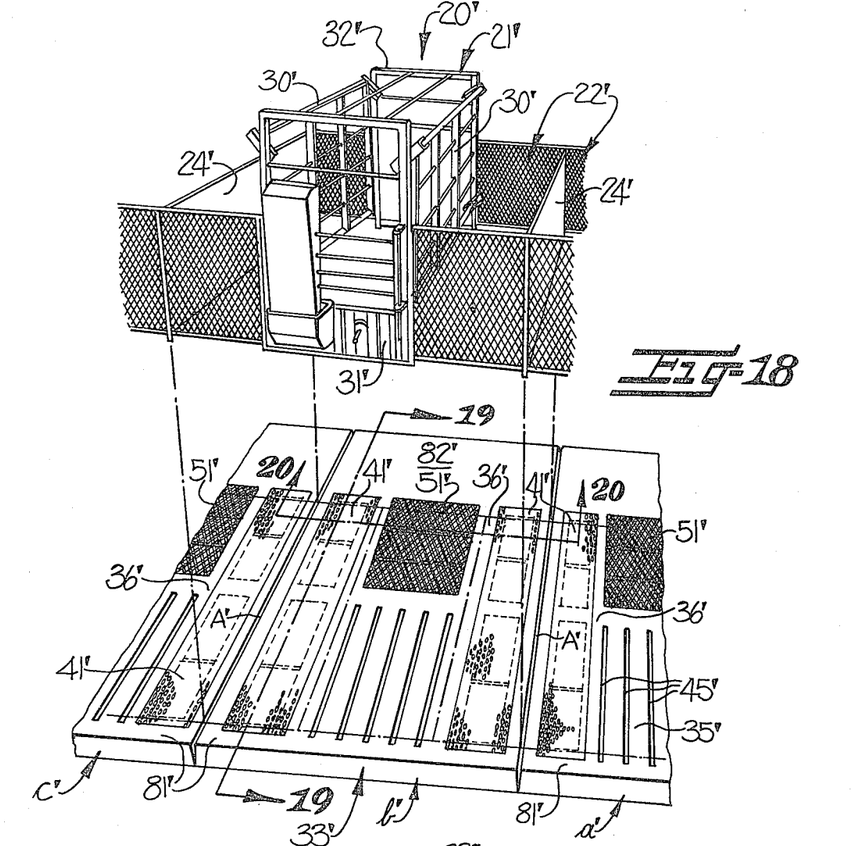
FIG. 18 is a partially exploded fragmentary perspective view somewhat similar to FIG. 1, but illustrating the second form of gang slat and the positional arrangement of a typical farrowing crate with respect thereto.

As shown in FIG. 18, an individual relatively narrow elongate foraminous insert 41' is provided for each of the opposing side sections 36' so that a pair of the elongate slat portions 90 are disposed between the adjacent foraminous inserts 41' of adjacent gang slats 33', such as the gang slats a', b' in FIG. 18. It is contemplated that the slat portions 90 along opposite sides of the side sections 36' of the gang slats 33' may be recessed so that a one-piece or common foraminous insert may be positioned over the adjacent side openings 37' of adjacent gang slats 33'. However, it is preferred that individual foraminous inserts 41' are used, as shown, and that the slat portions 90 are not recessed, so that the pigs' waste may be more readily dislodged from the slat portions 90 to pass through the openings in the foraminous inserts 41'.

It is thus seen that the present invention provides an improved flooring, and method of constructing the same, for an animal shelter for sows and newborn pigs, and within which farrowing crates are arranged in one or more rows, and wherein elongate concrete gang slats for supporting respective farrowing crates thereon are arranged in side-by-side relation and have elongate opposing side openings therein, preferably open to the respective sides of the gang slats, and which are adapted to accommodate thereover side pens on opposite sides of the respective central pens of the respective farrowing crates. It also can be seen that foraminous inserts are positioned in the side openings of the gang slats to form a foraminous flooring adapted to support litters of newborn pigs in the side pens of adjacent farrowing crates and in close proximity to sows in the central pens of the respective farrowing crates on the gang slats.

In the drawings and specification there have been set forth preferred embodiments of the invention, and although specific terms are employed, they are used in a generic and descriptive sense only, and not for purposes of limitation.

That which is claimed is:

1. In an animal shelter for newborn pigs and within which a plurality of farrowing crates are arranged in opposing rows, each farrowing crate having an elongate central pen for confining therein a sow, and elongate side pens extending along opposite sides of the central pen for confining a litter of pigs in close proximity to the sow, and wherein a center aisle is disposed between said opposing rows for access to the farrowing crates, the combination therewith of a plurality of elongate gang slats forming floor sections in the shelter and being arranged in rows to underlie and support the respective rows of farrowing crates, each gang slat being of an overall width about equal to the width of the respective farrowing crate and comprising an elongate central section formed from reinforced concrete and having a front portion and a rear portion adapted to support respective front and rear portions of a sow in the central pen of one of the farrowing crates, and end sections formed integrally with opposite ends of said central section and projecting laterally outwardly of opposite longitudinal side edges of said central section for defining opposite ends of opposing elongate relatively wide side openings extending along and being further defined by opposite longitudinal side edges of said central section, said opposing relatively wide side openings serving to accommodate respective opposing side pens of the respective farrowing crate thereover, said rear portion of said central section of each gang slat having a relatively large opening therein constituting at least a substantial portion of said rear portion, shoulder means defining marginal edge portions of each of said longitudinal side openings at said longitudinal side edges of said central section and at the outwardly projecting portions of said end sections and also at least partially defining marginal edge portions of said large opening in said rear portion of said central section, and said shoulder means being recessed relative to the upper surface of each respective gang slat, grate means carried by said rear portion of each gang slat central section and overlying said large opening thereof and engagingly supported upon the respective shoulder means with the upper surface of said grate means being positioned no higher than the upper surface of the respective gang slat, and foraminous insert means carried by the adjacent side portions of an immediately adjacent pair of said gang slats and overlying the adjacent side openings in said pair of gang slats and also being engagingly supported upon the respective shoulder means, the openings in said grate means and said foraminous insert means being of such size and number as to permit newborn pigs to walk thereon without injury, as by their feet being caught in the openings, while permitting the sow's and the newborn pigs' waste to pass therethrough.

2. A structure according to claim 1 wherein each side opening constitutes at least a substantial portion of the respective side section of the gang slat.

3. A structure according to claim 1 including a plurality of support members carried by each gang slat and extending across said elongate side openings to aid in supporting the respective foraminous insert means in said elongate side openings.

4. A structure according to claim 1 wherein said shoulder means is recessed to such depth that the upper surface of said foraminous insert means is positioned no higher than the upper surface of the respective gang slat.

5. A structure according to claim 1 wherein each of said foraminous insert means comprises expanded sheet metal provided with a plastic coating thereon with relatively smooth undulations therein defining the openings in the foraminous insert means.

6. A structure according to claim 1 wherein said openings in said foraminous insert means are elongate and are oriented so that the lengths thereof extend lengthwise of the respective insert means and so that lengthwise extending shoulders of the latter openings are oriented to be readily engaged by the rear feet of the pigs to enhance their footing during suckling.

7. An animal shelter according to claim 1 in which said gang slats include an end gang slat defining a terminal end of said row and as a consequence of which the relatively wide elongate side opening in the corresponding side section of said end gang slat faces outwardly at the terminal end of said row, said end gang slat having a longitudinally extending frame member attached thereto and bridging the otherwise open outer portion of the latter relatively wide elongate opening, and an additional foraminous insert means positioned in said latter opening and having an outer edge portion thereof engagingly supported upon said frame member.

8. A gang slat according to claim 1 further comprising opposing front end and rear end sections formed from reinforced concrete and integrally with opposite ends of said central section and said opposing side sections, and wherein said side sections include respective elongate outer slat portions also formed from concrete and integrally with said opposing end sections of the gang slat so that said slat portions close and form the outer boundaries of said relatively wide elongate openings in said side sections.

9. In an animal shelter for newborn pigs and having at least one row of farrowing crates therein, each farrowing crate including an elongate central pen for confining therein a sow and elongate side pens extending along opposing sides of the central pen for confining a litter of pigs in close proximity to the sow, the combination therewith of a row of concrete gang slats forming flooring in the shelter and adapted to support the row of farrowing crates thereon, each gang slat being of an overall width about equal to the width of a respective farrowing crate and having an elongate central section adapted to support a sow in the central pen of the respective farrowing crate, each central section having openings therein for passage of animal waste therethrough, and each gang slat also having opposing side sections extending along opposite sides of said central section and having elongate side openings therein adapted to accommodate thereover the opposing side pens of a respective farrowing crate, shoulder means at least partially defining the perimeters of the respective elongate side openings in said side sections of each gang slat and being recessed relative to the upper surface of the respective gang slat, and foraminous inserts positioned in said side openings and having edge portions of said inserts engagingly supported upon said recessed shoulder means of the respective openings in said side sections and forming foraminous flooring adapted to support the litters in the side pens of the respective farrowing crates.

10. In an animal shelter for newborn pigs and having at least one row of farrowing crates therein, each farrowing crate including an elongate central pen for confining therein a sow and elongate side pens extending along opposing sides of the central pen for confining a litter of pigs in close proximity to the sow, the combination therewith of a row of concrete gang slats forming flooring in the shelter and adapted to support the row of farrowing crates thereon, each gang slat being of an overall width about equal to the width of a respective farrowing crate and having an elongate central section adapted to support a sow in the central pen of the respective farrowing crate, each central section having openings therein for passage of animal waste therethrough, and each gang slat also having opposing side sections extending along opposite sides of said central section and having elongate side openings therein open to the respective sides of the gang slat and adapted to accommodate thereover the opposing side pens of a respective farrowing crate, said gang slats being arranged in side-by-side relation in said row so that the side openings in adjacent sides of said gang slats cooperate and combine with each other to form larger openings thereof, and foraminous inserts positioned in said larger openings and forming foraminous flooring adapted to support the litters in the side pens of immediately adjacent farrowing crates.

11. A structure according to claim 10 wherein said foraminous inserts in said larger openings comprise a unitary integrally formed insert positioned in each of said larger openings.

12. A structure according to claim 10 including insert supporting brackets positioned within and extending across said larger openings to aid in supporting the foraminous inserts.

13. A structure according to claim 10 including a plurality of insert supporting brackets extending transversely across each of said larger openings to aid in supporting the respective foraminous inserts.

14. A structure according to claim 10 wherein each of said concrete gang slats has a relatively large opening in the rear portion of said central section, and includes a grate positioned within said large opening in the rear portion of said central section.

15. A gang slat for use as a floor section in an animal shelter for newborn pigs and adapted to underlie and support thereon a farrowing crate having an elongate central pen for confining therein a sow and elongate side pens extending along opposite sides of the central pen for confining a litter of pigs in close proximity to the sow, said gang slat being formed from reinforced concrete and being of an overall width about equal to a respective farrowing crate and comprising an elongate concrete central section having a front portion and a rear portion adapted to support respective front and rear portions of a sow in the central pen of a respective farrowing crate, opposing concrete side sections extending along opposite sides of said central section and having elongate side openings therein adapted to accommodate thereover the opposing side pens of the farrowing crate, said rear portion of said central section of the gang slat having a relatively large opening therein constituting a substantial portion of said rear portion, and shoulder means at least partially defining the perimeters of each elongate side opening and said relatively large opening and being recessed relative to the upper surface of the gang slat, said gang slat being adapted to receive a grate in said relatively large opening in said central section with edge portions of the grate engagingly supported upon said shoulder means of said large opening, and said gang slat also being adapted to receive foraminous inserts in said side openings with edge portions of the inserts engagingly supported upon said recessed shoulder means of the respective side openings so as to form foraminous flooring to support a litter of pigs thereon in the side pens of a respective farrowing crate.

16. A gang slat for use as a floor section in an animal shelter for newborn pigs and adapted to underlie and support thereon a farrowing crate having an elongate central pen for confining therein a sow and elongate side pens extending along opposite sides of the central pen for confining a litter of pigs in close proximity to the sow, said gang slat being formed of reinforced concrete and being of an overall width about equal to the width of a respective farrowing crate and comprising an elongate concrete central section adapted to support a sow in the central pen of the respective farrowing crate and having openings therein for the passage of animal waste therethrough, opposing concrete side sections extending along opposite sides of said central section and having elongate side openings therein adapted to accommodate thereover the opposing side pens of the farrowing crate; and shoulder means at least partially defining the perimeters of the respective elongate side openings and being recessed relative to the upper surface of the gang slat, said gang slat being adapted to receive foraminous inserts in said side openings with edge portions of the inserts engagingly supported upon said recessed shoulder means of the respective side openings for forming foraminous flooring to support a litter of pigs thereon in the side pens of a respective farrowing crate.

17. A gang slat for use as a floor section in an animal shelter for newborn pigs and adapted to underlie and support thereon a farrowing crate having an elongate central pen for confining therein a sow and elongate side pens extending along opposite sides of the central pen for confining a litter of pigs in close proximity to the sow, said gang slat being formed of reinforced concrete and being of an overall width about equal to the width of a respective farrowing crate and comprising an elongate concrete central section adapted to support a sow in the central pen of the respective farrowing crate and having openings therein for the passage of animal waste therethrough, opposing concrete side sections extending along opposite sides of said central section and having elongate side openings therein open to the respective sides of the gang slat and adapted to accommodate thereover the opposing side pens of the farrowing crate, and shoulder means at least partially defining the perimeters of the respective elongate side openings and being recessed relative to the upper surface of the gang slat, said gang slat being adapted to receive foraminous inserts in said side openings with edge portions of the inserts engagingly supported upon said recessed shoulder means of the respective side openings for forming foraminous flooring to support a litter of pigs thereon in the side pens of a respective farrowing crate.

18. A method of constructing animal shelter flooring for accommodating at least one row of farrowing crates thereon, wherein each farrowing crate is of a type including an elongate central pen for confining therein a sow and has elongate side pens extending along opposing sides of the central pen for confining a litter of pigs in close proximity to the sow, said method comprising providing a plurality of concrete gang slats each of an overall width about equal to the width of a farrowing crate and having an elongate central section adapted to support a sow in the central pen of the farrowing crate, wherein the central section has openings therein for passage of animal waste therethrough, and wherein each gang slat also has opposing side sections extending along opposite sides of the central section and having elongate side openings therein open to the respective sides of the gang slat and adapted to accommodate thereover the opposing side pens of the farrowing crate, said method further comprising arranging the plurality of gang slats in side-by-side relation so that the side openings in adjacent sides of the gang slats cooperate and combine with each other to form larger openings thereof, and then positioning foraminous inserts in the larger openings to form a foraminous flooring adapted to support the litters in the side pens of immediately adjacent farrowing crates.

19. A method according to claim 18 wherein the step of positioning foraminous inserts in the larger openings to form a foraminous flooring to support the litters comprises positioning a unitary integrally formed insert in each of the larger openings.

20. A method according to claim 18 including positioning insert supporting brackets within and across the larger openings prior to positioning the inserts therein to aid in supporting the inserts.

21. A method according to claim 18 including positioning a plurality of insert supporting brackets transversely across each of the larger openings prior to positioning the inserts to aid in supporting the respective inserts.

22. A method according to claim 18 wherein each of the concrete gang slats has a relatively large opening in the rear portion of the central section and wherein the method further comprsies positioning a grate within such large opening in the rear portion of the central section.

* * * * *